United States Patent
Donahue

(10) Patent No.: US 6,964,242 B1
(45) Date of Patent: Nov. 15, 2005

(54) UNIVERSAL DOWN RIGGER ADAPTOR

(75) Inventor: Robert B. Donahue, 804 Elizabeth St., Batavia, IL (US) 60510

(73) Assignee: Robert B. Donahue, Batavia, IL (US)

( * ) Notice: Subject to any disclaimer, the term of this patent is extended or adjusted under 35 U.S.C. 154(b) by 4 days.

(21) Appl. No.: 10/813,821

(22) Filed: Apr. 1, 2004

(51) Int. Cl.⁷ ............................................ B63B 17/00
(52) U.S. Cl. ......................... 114/343; 43/21.2; 43/27.4
(58) Field of Search ....................... 114/343; 43/21.2, 43/27.4

(56) References Cited

U.S. PATENT DOCUMENTS

| | | | |
|---|---|---|---|
| 3,968,587 A | 7/1976 | Kammeraad | |
| 4,411,395 A * | 10/1983 | Steffens | 242/397.1 |
| 4,495,721 A | 1/1985 | Emory, Jr. | |
| 4,716,674 A * | 1/1988 | Kammeraad | 43/27.4 |
| 4,823,723 A * | 4/1989 | Brooks | 114/343 |
| D390,308 S | 2/1998 | Sieland et al. | |
| 5,860,839 A | 1/1999 | Hall | |
| 5,937,564 A | 8/1999 | Perreault | |
| 5,992,804 A | 11/1999 | Johnson | |
| 6,405,985 B1 * | 6/2002 | Glebe | 248/291.1 |
| 6,505,431 B1 | 1/2003 | Christian et al. | |

* cited by examiner

Primary Examiner—Sherman Basinger
(74) Attorney, Agent, or Firm—Ashkan Najafi

(57) ABSTRACT

A downrigger adaptor assembly includes a seat-mounting member having a helical spring disposed about a support post, engageable with a boat seat. The present invention further includes a mounting plate on which a downrigger base-mounting member is secured, and an elongated cable connected to the mounting plate and a stationary portion of a boat so that the assembly can be maintained within a predetermined path during operating conditions. Such a cable includes quick-release fastening members for allowing an operator to readily adjust the predetermined path as needed.

11 Claims, 4 Drawing Sheets

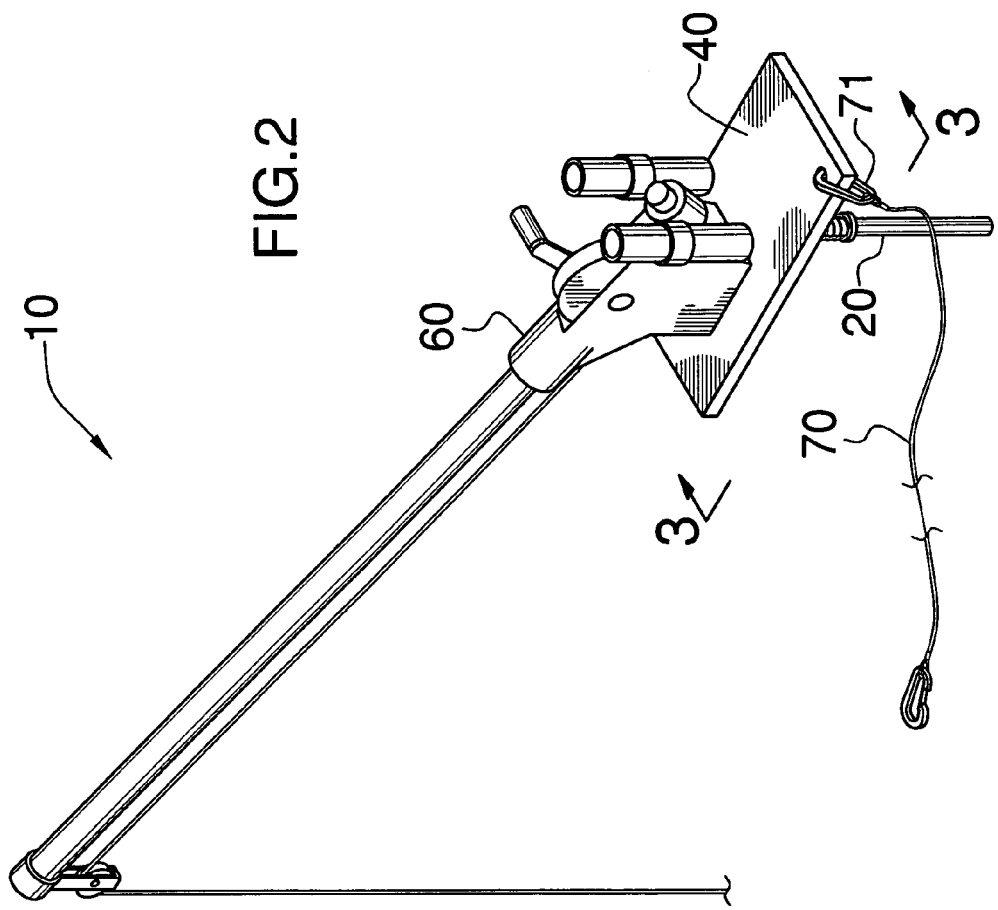

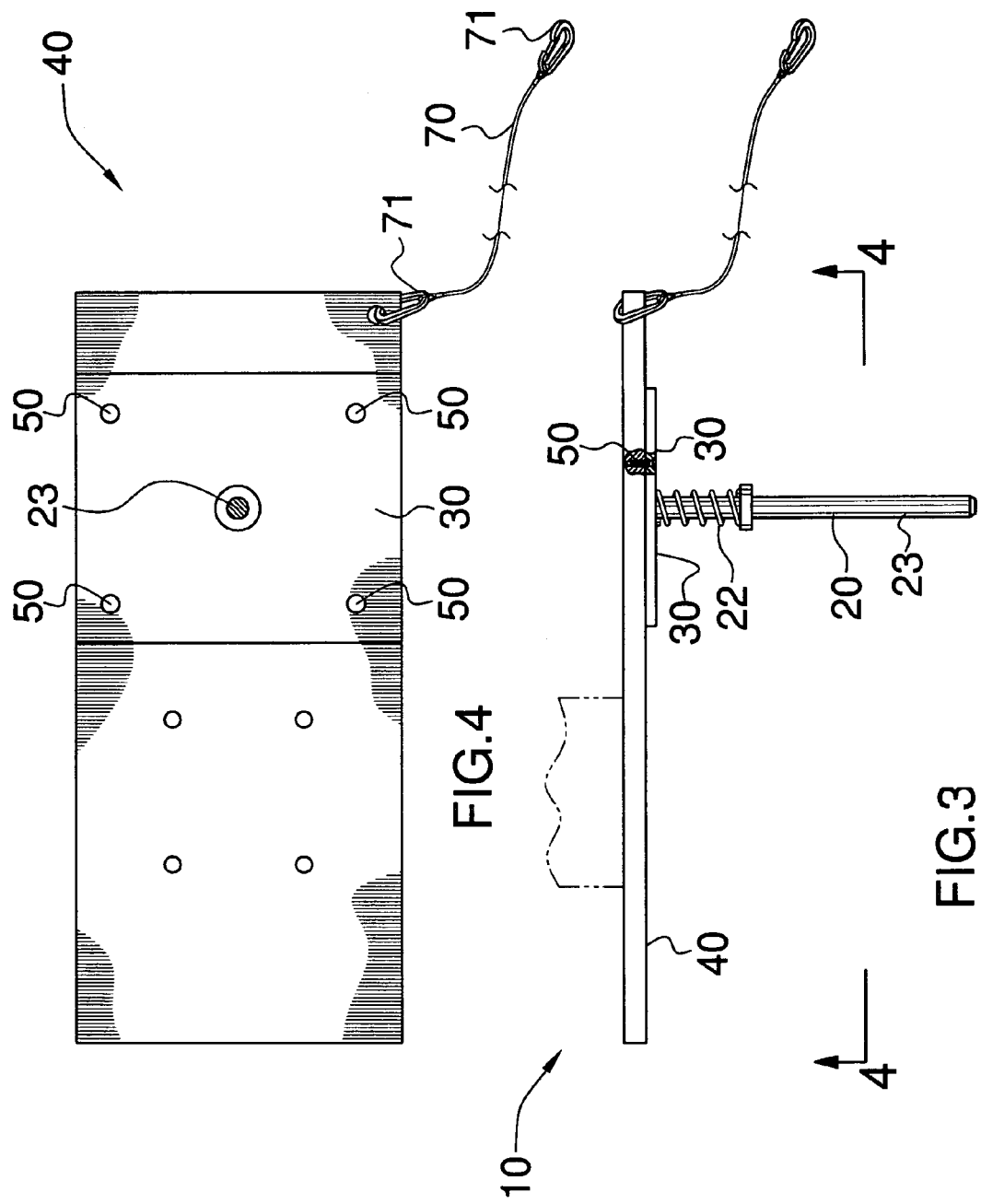

UNIVERSAL DOWN RIGGER ADAPTOR

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a down rigger adaptor and, more particularly, to an adjustable downrigger adaptor employable on fishing boats.

2. Prior Art

Various systems have heretofore been proposed for ocean or lake trolling to maintain the lure or bait attached to a fishing line at a predetermined depth. Such systems include so-called downriggers. The downrigger includes a reel, a boom and a downrigger line. Secured to the end of the downrigger line is a weight. The trolling weight functions to maintain the terminal fishing tackle including the lure or bait (which is attached to the fishing line) at the desired depth. Also supported by the line is a fishing line release. The line from a fishing rod is secured to the release.

When a fish strikes the lure or bait, the fishing line is automatically released from the trolling weight through the agency of the line release thereby separating the fishing line from the trolling weight so that the fisherman can play and land the fish with full rod and reel action and without the encumbrance of the trolling weight.

Downriggers have been utilized in trolling for various species of game fish. However, prior downriggers of the indicated character typically have been subject to a number of deficiencies. For example, many prior downriggers cannot be utilized in rough water, or where severe wave action is encountered which may cause excessive pitching, yawing or rolling of the boat, without the possibility of severe damage to the downrigger or to the deck or transom of the boat on which the downrigger is mounted. Other prior downriggers of the indicated character cannot be moved conveniently to an unobtrusive position when the downriggers are not in use, as for example, during fueling operations at a fueling dock, with the result that such prior downriggers often inhibit maneuvering of the boat in close quarters.

The maneuverability problem is often compounded when there are additional stable structures, such as chairs, present on the boat deck. A seat is often provided on a deck of a boat to permit any passenger thereof to sit thereon or fish therefrom. More particularly, the seat is typically pivotable about an axis thereof perpendicular to the boat deck, thereby permitting a passenger to sit thereon and face outwardly from the boat in any direction therefrom.

Accordingly, a need remains for a down rigger adaptor that may be removably mounted on a boat for overcoming the above-noted shortcomings.

BRIEF SUMMARY OF THE INVENTION

In view of the foregoing background, it is therefore an object of the present invention to provide a universal down rigger adaptor. These and other objects, features, and advantages of the invention are provided by a downrigger adaptor assembly employable on water vessels and including a seat-mounting member having a substantially rectangular frame with planar top and bottom surfaces and a plurality of apertures passing therethrough, at predetermined positions.

The seat-mounting member further includes a helical spring member disposed about the support post and extending along a partial length thereof. Such a spring member provides resilient force and thereby assists the assembly to maintain an equilibrium position after it is selectively adjusted during operating conditions.

Advantageously, the present invention further includes an elongated support post that has opposed end portions secured to the frame and removably engageable with a select portion of a boat seat, respectively, so that the seat-mounting member may be rotated in select radial paths.

The present invention further includes a mounting plate secured to the seat-mounting member and is disposed thereabove. Such a mounting plate has a substantially rectangular shape and further has a plurality of apertures formed therein for receiving a plurality of fastening members passing upwardly from the frame.

The present invention further includes a downrigger base-mounting member secured to the mounting plate and extending upwardly therefrom for receiving at least one fishing accessory. The downrigger base-mounting plate is preferably disposed adjacent a distal end portion of the mounting plate and the seat-mounting member is preferably offset at a proximal end portion of the mounting plate.

Advantageously, the present invention further includes an elongated cable having opposed end portions connected to the mounting plate and a stationary portion of a boat so that the assembly can be maintained within a predetermined arcuate path during operating conditions. Such a cable preferably includes a plurality of quick-release fastening members secured to the opposed end portions thereof and for allowing an operator to readily adjust the predetermined arcuate path as needed.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 2 is an enlarged perspective view of the present invention shown in FIG. 1;

FIG. 3 is an enlarged side-elevational view of the present invention shown in FIG. 2, taken along line 3—3;

FIG. 4 is an enlarged cross-sectional view of the present invention shown in FIG. 3, taken along line 4—4.

DETAILED DESCRIPTION OF THE INVENTION

Figure 1:
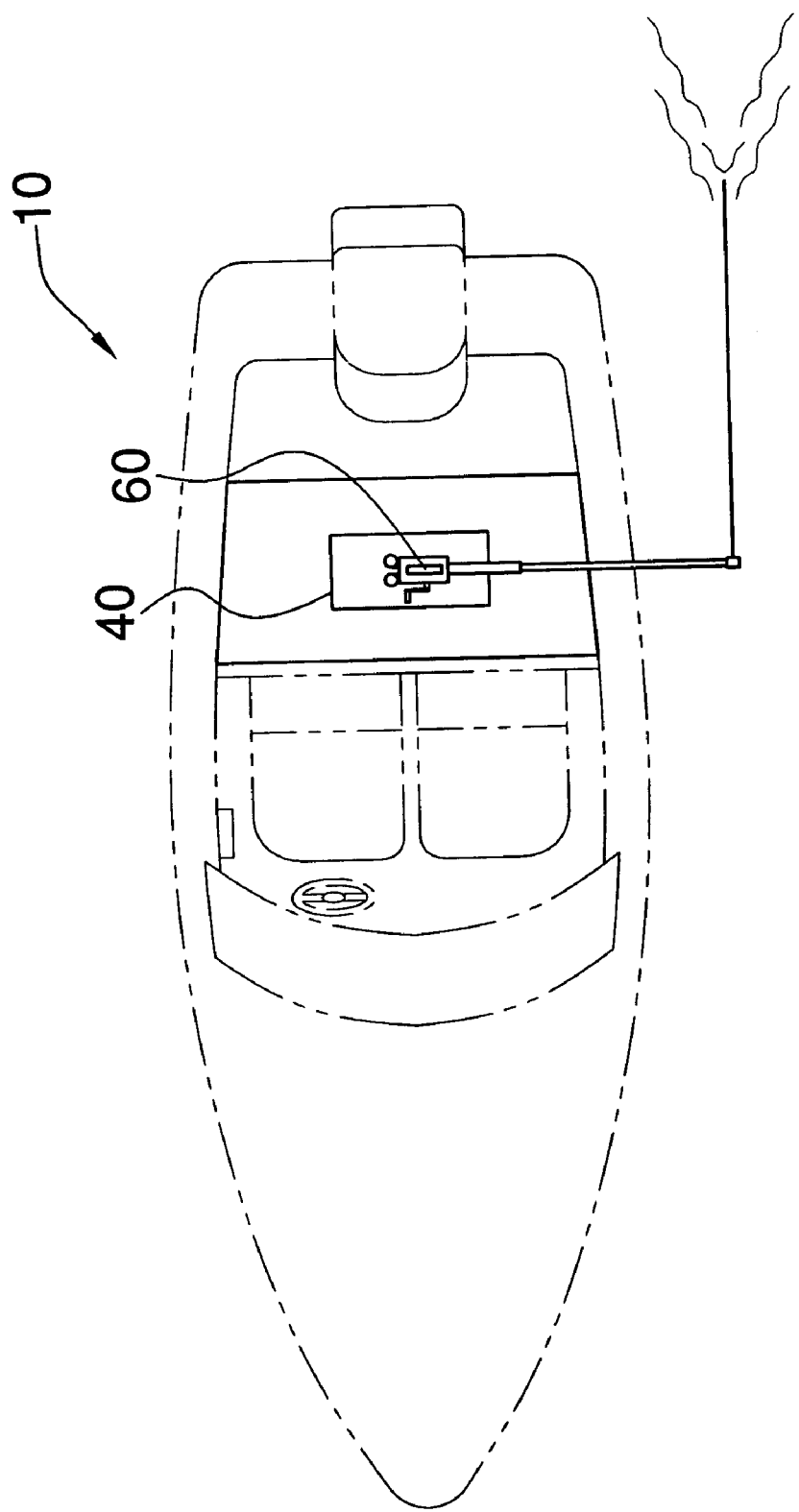
FIG. 1 is a top plan view showing a universal down rigger assembly securable to a water vessel, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1–5 by the reference numeral 10 and is intended to provide an adjustable downrigger adaptor employable on fishing boats. It should be understood that the assembly 10 is universal and therefore easily accepts various downriggers employed by fishermen.

Referring initially to FIGS. 3 and 4, the assembly 10 includes a seat-mounting member 20 having a substantially rectangular frame 30 with planar top and bottom surfaces and a plurality of apertures 21 passing therethrough, at predetermined positions. The seat-mounting member 20 further includes a helical spring member 22 disposed about the support post 23 and extending along a partial length thereof. Such a spring member 22 provides resilient force and thereby assists the assembly 10 to maintain an equilibrium position after it is selectively adjusted during operating conditions.

Advantageously, the present invention further includes an elongated support post 23 that has opposed end portions secured to the frame 30 and removably engageable with a select portion of a boat seat, respectively, so that the seat-mounting member 20 may be rotated in select radial paths.

Figure 5:
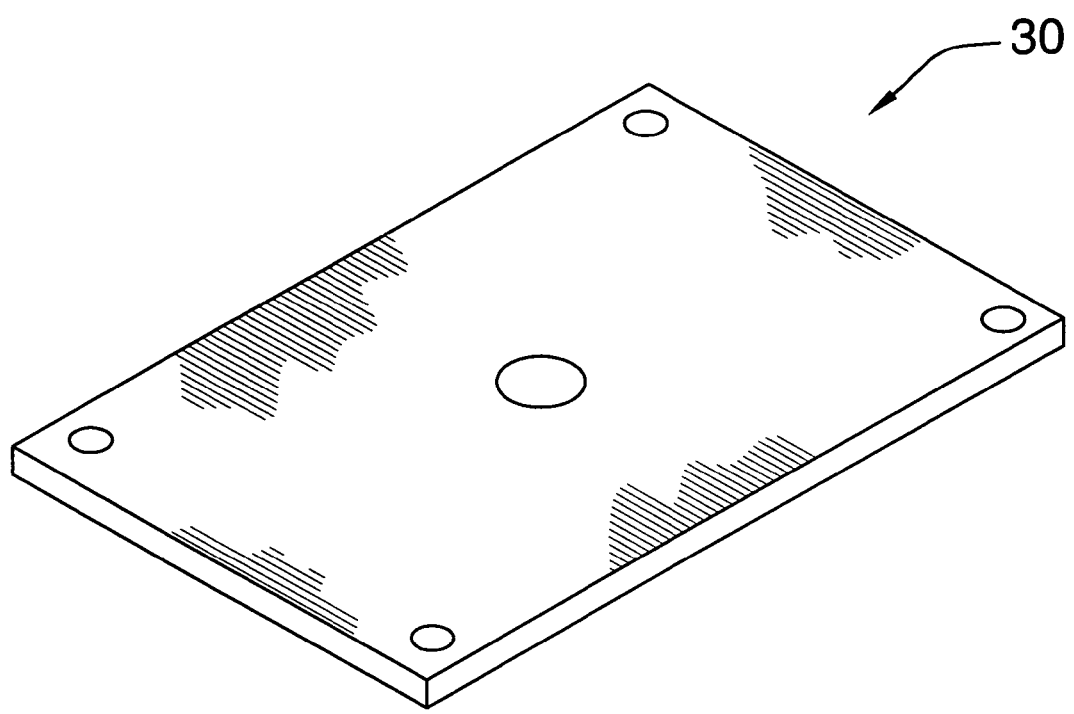
FIG. 5 is an enlarged perspective view of the boat seat frame shown in FIG. 3.

The present invention further includes a mounting plate 40, best shown in FIG. 5, secured to the seat-mounting member 20 and is disposed thereabove. Such a mounting plate 40 has a substantially rectangular shape and further has a plurality of apertures formed therein for receiving a plurality of fastening members 50 passing upwardly from the frame 30, as best shown in FIGS. 3 and 4.

Referring to FIGS. 1 and 2, the present invention further includes a downrigger base-mounting member 60 secured to the mounting plate 40 and extending upwardly therefrom for receiving at least one fishing accessory. The downrigger base-mounting plate 60 is preferably disposed adjacent a distal end portion of the mounting plate 40 and the seat-mounting member 20 is preferably offset at a proximal end portion of the mounting plate 40.

Referring to FIG. 2, the present invention advantageously includes an elongated cable 70 having opposed end portions connected to the mounting plate 40 and a stationary portion of a boat so that the assembly 10 can be maintained within a predetermined arcuate path during operating conditions. Such a cable 70 preferably includes a plurality of quick-release fastening members 71 secured to the opposed end portions thereof and for allowing an operator to readily adjust the predetermined arcuate path as needed.

The present invention enables a downrigger to be set up in a simple and convenient manner for providing enjoyable fishing activities. It also avoids drilling holes into the boat or making permanent modifications to accommodate a downrigger. In operation, the fisherman simply removes the upper portion of the rear seat so the bottom seat post could be inserted. When not in use, the downrigger rotates down the centerline of the boat out of the way.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed is:

1. A downrigger adaptor assembly employable on water vessels and comprising:
   a seat-mounting member comprising
      a substantially rectangular frame having planar top and bottom surfaces and a plurality of apertures passing therethrough at predetermined positions, and
      an elongated support post having opposed end portions secured to said frame and removably engageable with a select portion of a boat seat so that said seat-mounting member can be rotated in select radial paths;
   wherein said seat-mounting member further comprises a helical spring member disposed about said support post and extending along a partial length thereof, said spring member for providing resilient force and thereby assisting said assembly to maintain an equilibrium position after being selectively adjusted during operating conditions;
   a mounting plate secured to said seat-mounting member and being disposed thereabove, said mounting plate having a substantially rectangular shape and further having a plurality of apertures formed therein for receiving a plurality of fastening members passing upwardly from said frame; and
   a downrigger base-mounting member secured to said mounting plate and extending upwardly therefrom for receiving at least one fishing accessory.

2. The downrigger adaptor assembly of claim 1, wherein said downrigger base-mounting member is disposed adjacent a distal end portion of said mounting plate and said seat-mounting member is offset at a proximal end portion of said mounting plate.

3. The downrigger adaptor assembly of claim 1, further comprising: an elongated cable having opposed end portions connected to said mounting plate and a stationary portion of a boat so that said assembly can be maintained within a predetermined arcuate path during operating conditions.

4. The downrigger adaptor assembly of claim 3, wherein said cable comprises: a plurality of quick-release fastening members secured to said opposed end portions thereof and for allowing an operator to readily adjust the predetermined arcuate path as needed.

5. A downrigger adaptor assembly employable on water vessels and comprising:
   a seat-mounting member comprising
      a substantially rectangular frame having planar top and bottom surfaces and a plurality of apertures passing therethrough at predetermined positions,
      an elongated support post having opposed end portions secured to said frame and removably engageable with a select portion of a boat seat so that said seat-mounting member can be rotated in select radial paths, and a helical spring member disposed about said support post and extending along a partial length thereof, said spring member for providing resilient force and thereby assisting said assembly to maintain an equilibrium position after being selectively adjusted during operating conditions;

a mounting plate secured to said seat-mounting member and being disposed thereabove, said mounting plate having a substantially rectangular shape and further having a plurality of apertures formed therein for receiving a plurality of fastening members passing upwardly from said frame; and a downrigger base-mounting member secured to said mounting plate and extending upwardly therefrom for receiving at least one fishing accessory.

6. The downrigger adaptor assembly of claim 5, wherein said downrigger base-mounting member is disposed adjacent a distal end portion of said mounting plate and said seat-mounting member is offset at a proximal end portion of said mounting plate.

7. The downrigger adaptor assembly of claim 4, further comprising: an elongated cable having opposed end portions connected to said mounting plate and a stationary portion of a boat so that said assembly can be maintained within a predetermined arcuate path during operating conditions.

8. The downrigger adaptor assembly of claim 7, wherein said cable comprises: a plurality of quick-release fastening members secured to said opposed end portions thereof and for allowing an operator to readily adjust the predetermined arcuate path as needed.

9. A downrigger adaptor assembly employable on water vessels and comprising:

a seat-mounting member comprising a substantially rectangular frame having planar top and bottom surfaces and a plurality of apertures passing therethrough at predetermined positions, an elongated support post having opposed end portions secured to said frame and removably engageable with a select portion of a boat seat so that said seat-mounting member can be rotated in select radial paths, and a helical spring member disposed about said support post and extending along a partial length thereof, said spring member for providing resilient force and thereby assisting said assembly to maintain an equilibrium position after being selectively adjusted during operating conditions;

a mounting plate secured to said seat-mounting member and being disposed thereabove, said mounting plate having a substantially rectangular shape and further having a plurality of apertures formed therein for receiving a plurality of fastening members passing upwardly from said frame; and a downrigger base-mounting member secured to said mounting plate and extending upwardly therefrom for receiving at least one fishing accessory, said downrigger base-mounting member being disposed adjacent a distal end portion of said mounting plate and said seat-mounting member is offset at a proximal end portion of said mounting plate.

10. The downrigger adaptor assembly of claim 9, further comprising: an elongated cable having opposed end portions connected to said mounting plate and a stationary portion of a boat so that said assembly can be maintained within a predetermined arcuate path during operating conditions.

11. The downrigger adaptor assembly of claim 10, wherein said cable comprises: a plurality of quick-release fastening members secured to said opposed end portions thereof and for allowing an operator to readily adjust the predetermined arcuate path as needed.

* * * * *